US012173871B2

(12) United States Patent
Dionas

(10) Patent No.: US 12,173,871 B2
(45) Date of Patent: Dec. 24, 2024

(54) MINIMIZED PROFILE SURFACE LIGHTING

(71) Applicant: Polyxeni, LLC, Alpharetta, GA (US)

(72) Inventor: Efthimios Mike Dionas, Alpharetta, GA (US)

(73) Assignee: POLYXENI, LLC, Alpharetta, GA (US)

( * ) Notice: Subject to any disclaimer, the term of this patent is extended or adjusted under 35 U.S.C. 154(b) by 0 days.

(21) Appl. No.: 18/365,639

(22) Filed: Aug. 4, 2023

(65) Prior Publication Data

US 2024/0328608 A1 Oct. 3, 2024

Related U.S. Application Data

(60) Provisional application No. 63/492,898, filed on Mar. 29, 2023.

(51) Int. Cl.

*F21V 21/04* (2006.01)
*F21S 9/02* (2006.01)
*F21V 17/16* (2006.01)
*F21V 21/14* (2006.01)
*F21V 23/00* (2015.01)
*F21Y 115/10* (2016.01)

(52) U.S. Cl.

CPC ............ *F21V 21/048* (2013.01); *F21S 9/022* (2013.01); *F21V 17/164* (2013.01); *F21V 21/14* (2013.01); *F21V 23/002* (2013.01); *F21Y 2115/10* (2016.08)

(58) Field of Classification Search

CPC .... F21V 21/048; F21V 21/047; F21V 21/049; F21V 21/04; F21V 21/34; F21S 9/022; F21S 8/026

See application file for complete search history.

(56) References Cited

U.S. PATENT DOCUMENTS

2008/0112171 A1* 5/2008 Patti ........................ F21V 21/04 362/372
2015/0233556 A1* 8/2015 Danesh ................. F21V 21/048 362/365
2015/0252988 A1* 9/2015 Rashidi Doust ........ F21V 29/70 362/373
2017/0307189 A1* 10/2017 Eidsvold ................. F21S 8/026
2019/0063701 A1* 2/2019 Lotfi ..................... F21V 23/026

(Continued)

*Primary Examiner* — William N Harris

(74) *Attorney, Agent, or Firm* — Shumaker, Loop & Kendrick, LLP; Jeffrey B. Fabian

(57) ABSTRACT

An lighting system includes a mounting assembly configured for mounting on a host structure above a ceiling, and a lighting module for attachment to the mounting assembly, including a lighting unit having a mounting side configured for attachment to the mounting assembly approximately flush with the ceiling. An electronics module supported by the mounting assembly includes an onboard battery and circuitry that powers the lighting module by use of the battery upon detecting a power failure. The lighting unit has a predefined depth extending from the ceiling, defining a low profile system. The mounting assembly is generally occluded above a ceiling. A ring bezel circumferentially surrounds the lighting unit and opens at least in the direction of the an illuminating side thereof. The bezel has a downward facing annular ring by which the illuminating side is offset to protect same from incidental contact in handling, packaging, installation, and use.

21 Claims, 13 Drawing Sheets

(56) References Cited

U.S. PATENT DOCUMENTS

| | | | | |
|---|---|---|---|---|
| 2020/0363025 | A1* | 11/2020 | Jeswani ................ | F21V 23/003 |
| 2020/0393098 | A1* | 12/2020 | Boulanger ................ | F21S 9/02 |
| 2024/0344675 | A1* | 10/2024 | Danesh ................... | F21V 15/01 |

* cited by examiner

MINIMIZED PROFILE SURFACE LIGHTING

CROSS-REFERENCE TO RELATED APPLICATION

This application claims the benefit of priority of U.S. provisional patent application No. 63/492,898, titled "Minimized Profile Surface Lighting," filed on Mar. 29, 2023, which is incorporated herein in its entirety by this reference.

TECHNICAL FIELD

The present disclosure relates to lighting systems for low-profile mounting along architectural surfaces. More particularly, the present disclosure relates to low-profile EM lightings system for ceiling and other surfaces.

BACKGROUND

To assure foot traffic safety during power outages, and emergency evacuations, passageways in commercial buildings and multi-unit dwellings typically have lighting fixtures that illuminate exit routes and interior thoroughfares. Regulations in some locations require, for example, that an emergency light path is maintained for a minimum duration, such as ninety minutes, after power is lost in a building to grant residents time to safely evacuate. The use of emergency (EM) lighting units with on-board power sources such as batteries avoids reliance on comprehensive back-up wiring schemes and/or installation generators.

EM corridor lighting was first popularized as wall mounted units termed "bug eyes" with reference to the use of paired bulbs illuminating paths in separate directions. Ceiling-mounted units have grown in popularity in part due to easy access to spaces above ceilings for attaching fixtures and routing electrical wires. On-board batteries and minimum lighting duration requirements for emergency use contribute to the size, weight, and expense of EM lighting units.

Traditional, and still commercially available, EM lighting products are generally bulky with an intrusive and unsightly appearance where elegant or uniform lighting units are preferred. The bulky appearance of traditional EM lighting units presents challenges for installation and interior design.

To ensure sufficient lighting in an emergency situation and regulatory compliance, there are often a limited number of locations where EM lighting can be installed, such as proximal to points of entry and exit. Such location must have the load bearing capacity or features to support the weight and size of traditional EM lighting. Additionally, when selecting EM lighting, it is challenging or impossible to select EM lighting units that blend or match with other non-EM lighting units in the surrounding space or that comport with the surrounding decor.

Given the drawbacks with traditional EM lighting, it would be advantageous to provide low-profile EM lighting configured for expedient installation, that matches the surrounding non-EM lighting units, and that includes a battery backup for long-lasting emergency light duration.

SUMMARY

This summary is provided to briefly introduce concepts that are further described in the following detailed descriptions. This summary is not intended to identify key features or essential features of the claimed subject matter, nor is it to be construed as limiting the scope of the claimed subject matter.

In at least one embodiment, an lighting system includes: a mounting assembly configured for mounting on a host structure proximal a mounting surface; a lighting module including a lighting unit having a mounting side configured for attachment to the mounting assembly approximately flush with the mounting surface; and an electronics module supported by the mounting assembly. The electronics module includes an onboard battery that powers the lighting module upon the electronics module detecting a power failure.

In some examples, the lighting unit has a small predefined depth extending from the mounting surface, defining a low profile lighting system, with the mounting assembly generally out of sight above the mounting surface.

The mounting surface may be a ceiling portion, and the mounting assembly may be generally out of sight in a plenum above the ceiling portion.

The lighting unit may include a wiring harness extending from the mounting side thereof for electrically coupling the lighting unit to a corresponding wiring harness of the electronics module.

The lighting module may include spring clips attached to the mounting side of the lighting unit, and extending therefrom, for mechanically coupling the lighting module to the mounting assembly by engaging a mounting flange.

The spring clips may include two spring clips diametrically opposed with respect to a proximal end of the wiring harness of the lighting unit.

The lighting unit may be circular, and the two spring clips may be diametrically opposed across a geometric center of the mounting side of lighting unit, where the proximal end of the wiring harness of the lighting unit extends from the lighting unit.

The mounting flange may have an opening through which the wiring harness of the electronics module extends for electrically coupling to the wiring harness of the lighting unit during installation.

The opening of the mounting flange can be dimensioned to accommodate passage of the wiring harness of the lighting unit electrically coupled to the wiring harness of the electronics module into an interior space of the mounting assembly.

In some examples, when the lighting module is pressed toward the mounting assembly, the spring clips elastically deform to pass through the opening, and resiliently expand as they extend therethrough, thereby automatically capturing the mounting flange.

Upon complete assembly, a ceiling portion can be captured between the mounting assembly and the mounting flange.

The mounting assembly may include a housing and at least a first bracket arm for attaching the mounting assembly to a host structure.

The first bracket arm may include a base and opposing brackets extending in opposite directions from the base.

The brackets may have mounting holes for use in attaching the mounting assembly to the host structure.

One or more of the brackets may include a mounting plate for attachment to a first side of the host structure, and a claw end extending at a right angle from the mounting plate for registration with a second side of the host structure.

The mounting assembly may include at least one track mounted on the housing, and the base of the first bracket arm may be mounted at an adjustable position on the at least one track.

The mounting assembly may include a housing and two bracket arms attached to opposing sides of the housing. Each bracket arm of the two bracket arms may include a base and two opposing brackets extending in opposite directions from the base, and each bracket arm may be attached by the respective base thereof to the housing by way two parallel linear tracks mounted on the respective side of the housing.

The base of each bracket arm may be mounted at an independently adjustable position along the two parallel linear tracks.

The base of each bracket arm may be mounted at an independently adjustable position along the two parallel linear tracks by fasteners engaged with the tracks, and the fasteners may selectively permit movement of the housing relative to the bracket arms.

The movement of the housing relative to the bracket arms may permit adjustment of the housing relative to the mounting surface in use.

According to at least one embodiment, a lighting system includes: a mounting assembly comprising a housing, at least a first track mounted on the housing, and at least a first bracket arm for attaching the housing to a host structure, the first bracket arm comprising a base and opposing brackets extending in opposite directions from the base, the base being mounted at an adjustable position on the first track; and a lighting unit having a mounting side configured for attachment to the mounting assembly.

At least one bracket of said opposing brackets in at least one example includes a mounting plate for attachment to a host structure, and a claw end extending from the mounting plate.

The mounting assembly may further include: at least a second track mounted on the housing, the first track and second track mounted on opposing sides of the housing; and a second bracket arm comprising a base and opposing brackets extending in opposite directions from the base, the base being mounted at an adjustable position on the second track.

The mounting assembly may further include: a third track mounted on the housing on a same side thereof as the first track, the first track and third track being each linear and parallel to each other, the base of the first bracket arm being mounted at an adjustable position on the third track; and a fourth track mounted on the housing on a same side thereof as the second track, the second track and fourth track being each linear and parallel to each other, the base of the second bracket arm being mounted at an adjustable position on the fourth track.

In at least one example, the base of the first bracket arm is mounted at a first adjustable position along the first and third track; the base of the second bracket arm is mounted at a second adjustable position along the second and fourth track; and the first adjustable position and second adjustable position are independently adjustable.

The first adjustable position and second adjustable position can be independently adjustable to selectively permit movement of the housing relative to the bracket arms.

At least one bracket of said opposing brackets includes mounting holes for use in attaching the mounting assembly to the host structure.

A mounting flange may be included, and the lighting unit may include spring clips attached to the mounting side thereof for mechanically coupling the lighting unit to the mounting assembly by engaging the mounting flange.

The above summary is to be understood as cumulative and inclusive. The above and below described features are to be understood as combined in whole or in part in various embodiments whether expressly described herein or implied by at least this reference. For brevity, not all features are expressly described and illustrated as combined with all other features. No combination of features shall be deemed unsupported for merely not appearing expressly in the drawings and descriptions.

BRIEF DESCRIPTION OF THE DRAWINGS

The previous summary and the following detailed descriptions are to be read in view of the drawings, which illustrate some, but not all, embodiments and features as briefly described below. The summary and detailed descriptions, however, are not limited to only those embodiments and features explicitly illustrated.

DETAILED DESCRIPTIONS

Figure 1:
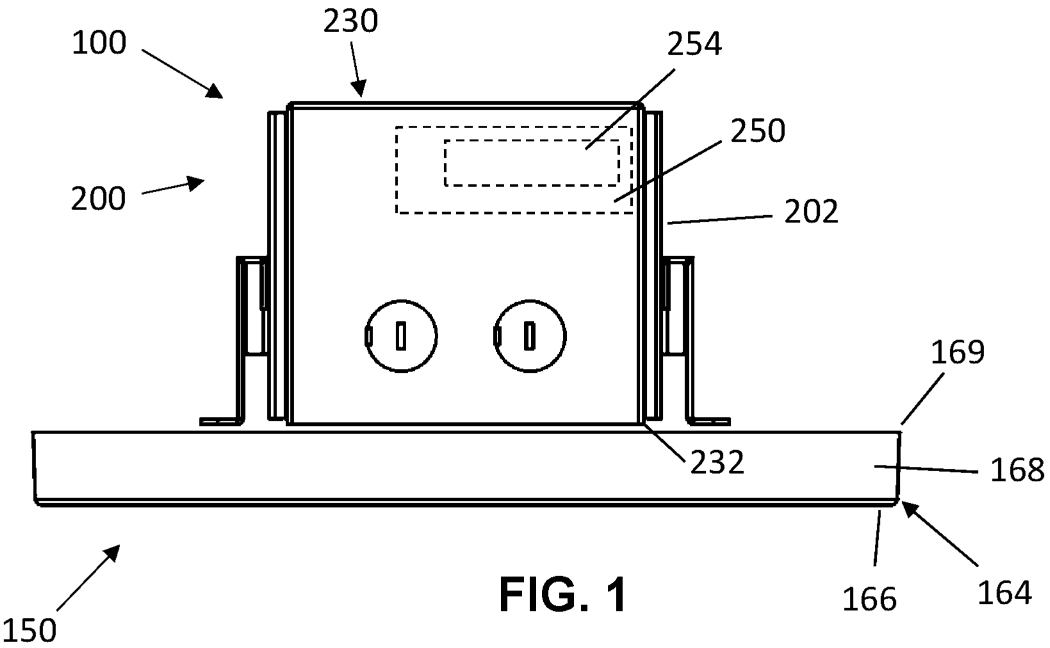
FIG. 1 is an elevation view of a lighting system according to an inventive embodiment disclosed herein.
Figure 2:
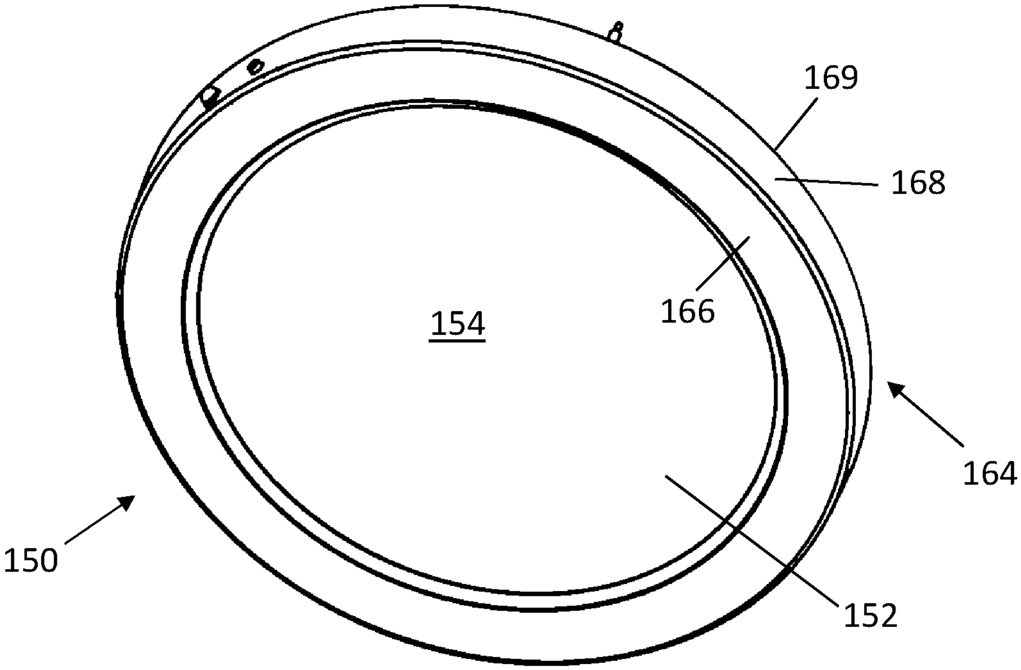
FIG. 2 is bottom perspective view of a lighting module of the system of the lighting system of FIG. 1, according to at least one embodiment, showing the illuminating side of the module.
Figure 3:
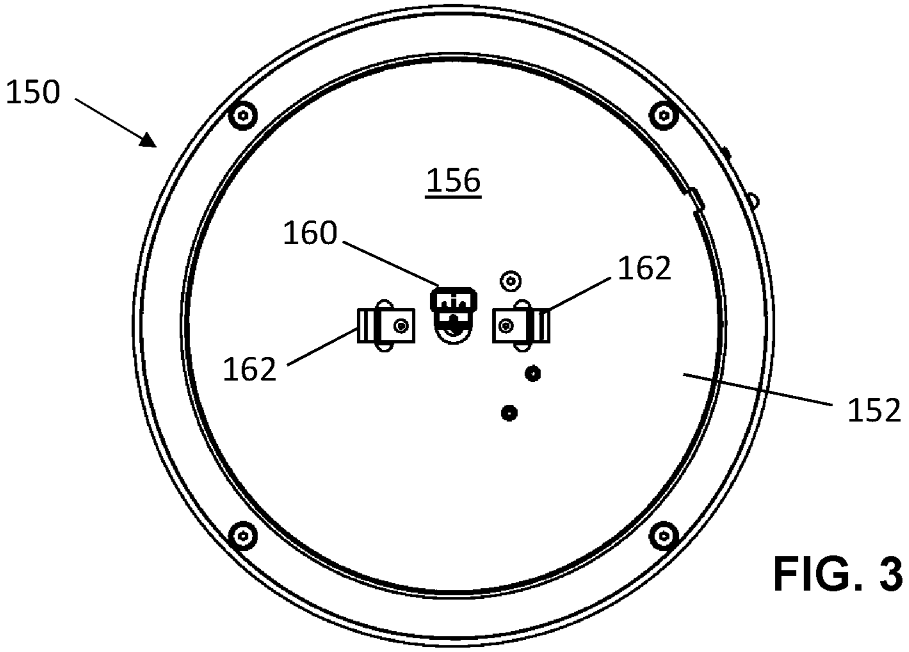
FIG. 3 is top plan view of a lighting module of the system of FIG. 1, showing the top mounting side thereof.
Figure 4:
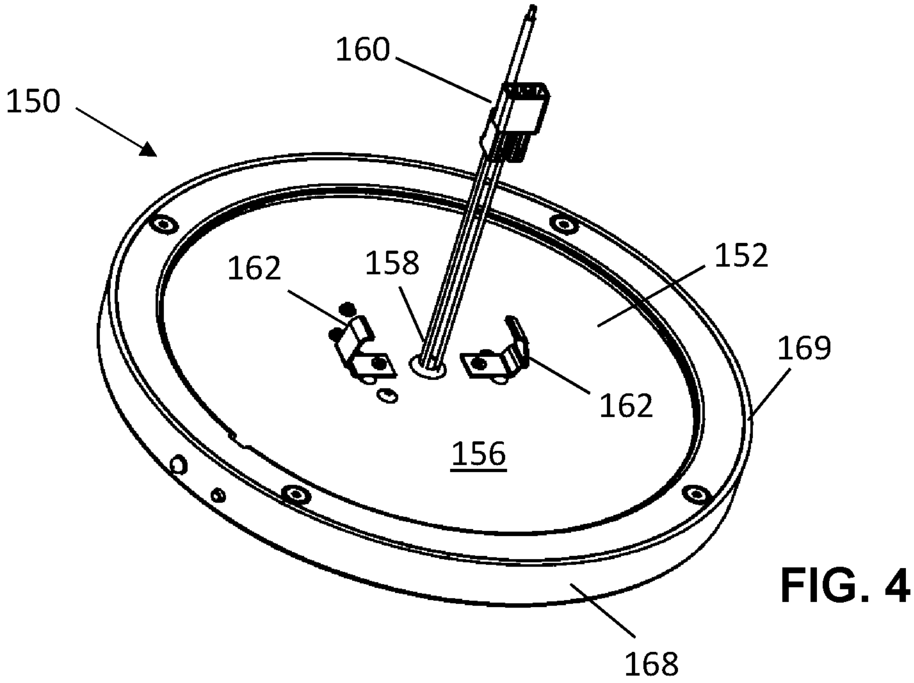
FIG. 4 is a top perspective view of the lighting module of FIG. 4, also showing the mounting side thereof.

The present invention will now be described more fully with reference to the accompanying pictures in which example embodiments of the invention are shown. However, the invention may be embodied in many different forms and should not be construed as limited to the representative embodiments set forth herein. The example embodiments are provided so that this disclosure will be both thorough and complete and will fully convey the scope of the invention to enable one of ordinary skill in the art to make, use, and practice the invention.

Relative terms such as lower or bottom; upper or top; upward, outward, or downward; forward or backward; and vertical or horizontal may be used herein to describe one element's relationship to another element illustrated in the figures. It will be understood that relative terms are intended to encompass different orientations in addition to the orientation depicted in the drawings. By way of example, if a component in the drawings is turned over, elements described as being on the "bottom" of the other elements would then be oriented on "top" of the other elements. Without ambiguity, FIG. 5 can be described as a top view of a housing, showing the top thereof, in the context of installing the below-described lighting system in a ceiling, with the lighting module below the housing. These and similar terms and other relative terminology, such as "substantially" or "about," which may describe specified materials, orientation, steps, parameters, or ranges as well as those that do not materially affect the basic and novel characteristics of the claimed inventions as whole.

Any dimensions expressed or implied in the drawings and these descriptions are provided for exemplary purposes. Thus, not all embodiments within the scope of the drawings and these descriptions are made according to such exemplary dimensions. The drawings are not made necessarily to scale. Thus, not all embodiments within the scope of the drawings and these descriptions are made according to the apparent scale of the drawings with regard to relative dimensions in the drawings. However, for each drawing, at least one embodiment is made according to the apparent relative scale of the drawing.

Like reference numbers used throughout the drawings depict like or similar elements. Unless described or implied as exclusive alternatives, features throughout the drawings and descriptions should be taken as cumulative, such that features expressly associated with some particular embodiments can be combined with other embodiments.

Unless defined otherwise, technical and scientific terms used herein have the same meaning as commonly understood to one of ordinary skill in the art to which the presently disclosed subject matter pertains. Although any methods, devices, and materials similar or equivalent to those described herein can be used in the practice or testing of the presently disclosed subject matter, representative methods, devices, and materials are now described.

A lighting system 100 according to at least one embodiment is shown as assembled in FIG. 1, and modular components thereof are shown in FIGS. 2-9. The system 100 includes a lighting module 150 mechanically and electrically connected to a mounting assembly 200. The lighting module 150 and mounting assembly 200 are separable for convenience during installation of the system. An electronics module 250 (FIGS. 6-7), shown in dashed view in FIG. 1, resides within the mounting assembly 200 and powers the lighting module 150.

The lighting module 150 has LED based lighting unit 152 with a small depth D (FIG. 7) to facilitate a minimized profile when the lighting system 100 is installed as a surface lighting system along a surface such as a ceiling, which is a non-limiting example of use of the lighting system 100. The lighting unit 152 having a circular disk-like form overall, has an illuminating side 154 (FIG. 2) directed into an area to be lit in use, and an opposite mounting side 156 (FIGS. 3-4) for attaching the lighting module 150 to the mounting assembly 200.

Figure 7:
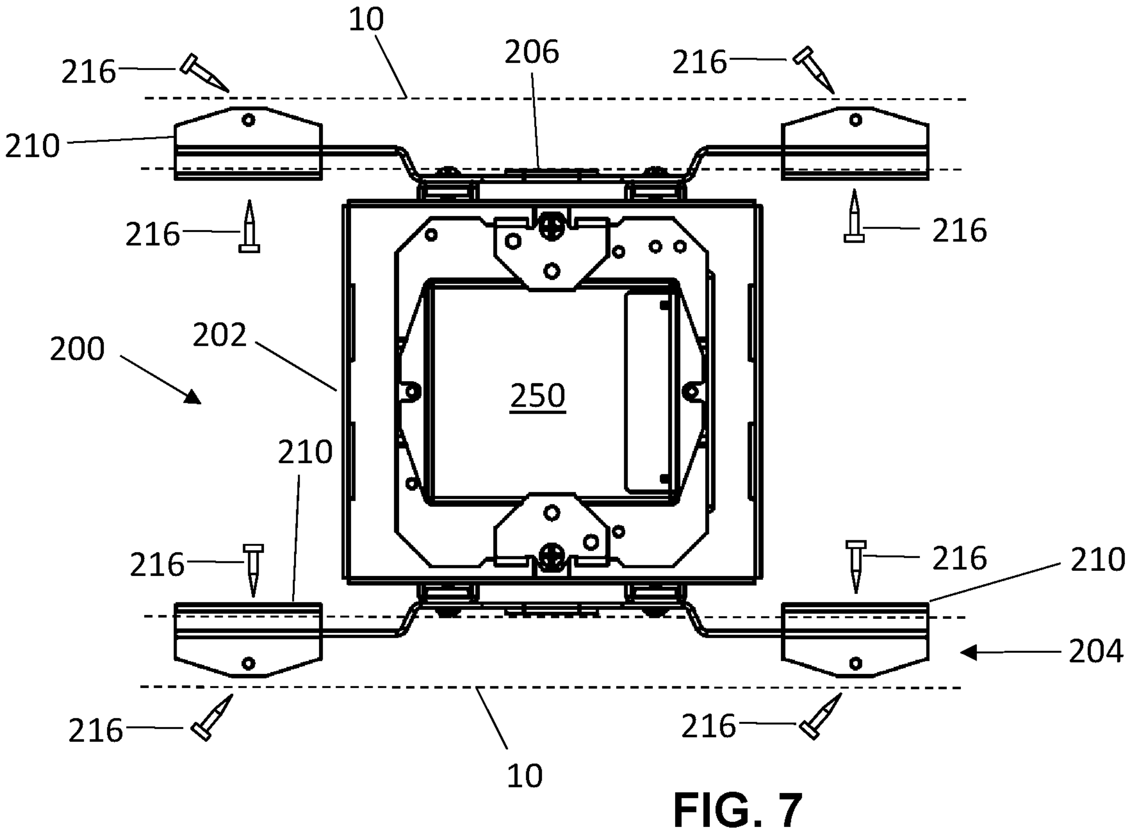
FIG. 7 is a bottom view of a mounting assembly of the system of FIG. 1, taken from directly below with respect to a typical installation orientation, showing the assembly mounted on host structures shown in dashed lines.
Figure 8:
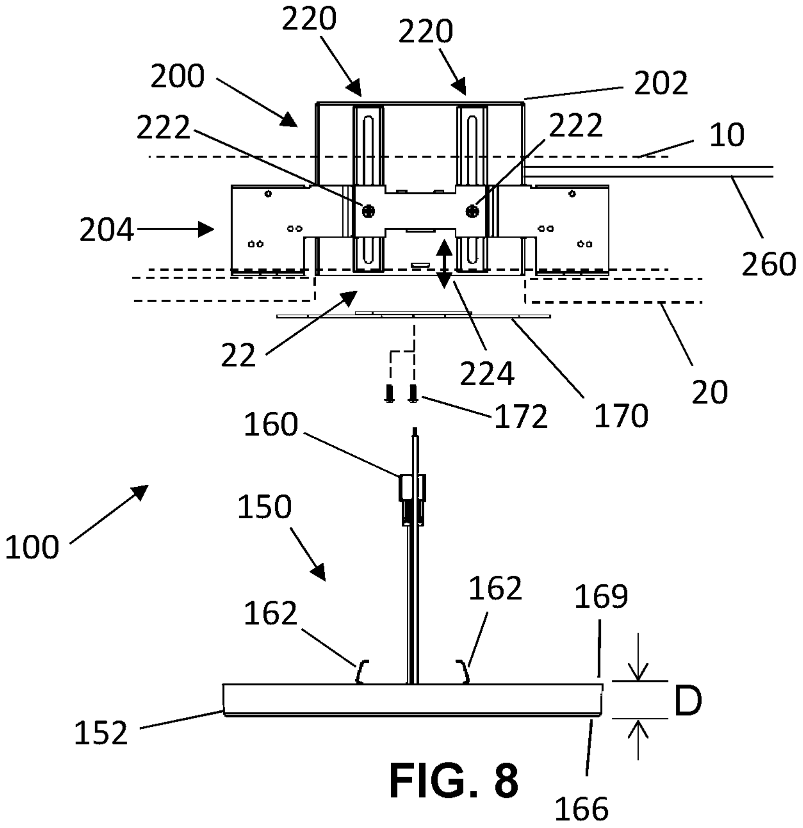
FIG. 8 is an exploded elevation view of the system of FIG. 1, showing a host structure and a mounting surface in dashed lines representing an installation of the system.
Figure 9:
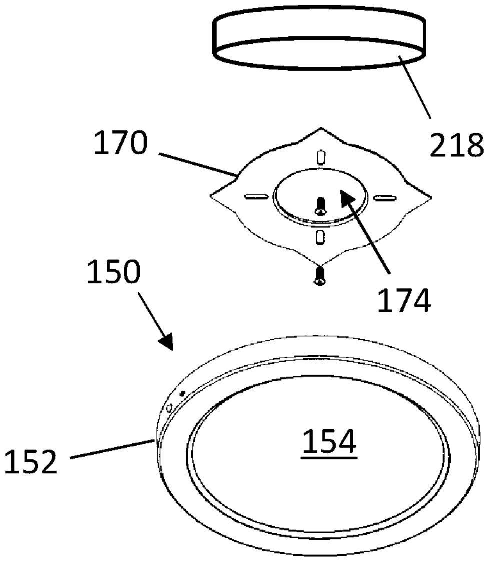
FIG. 9 is an exploded perspective view of the lighting module, a mounting flange, and an optional spacer, of the system of FIG. 1 according to at least one embodiment.
Figure 10:
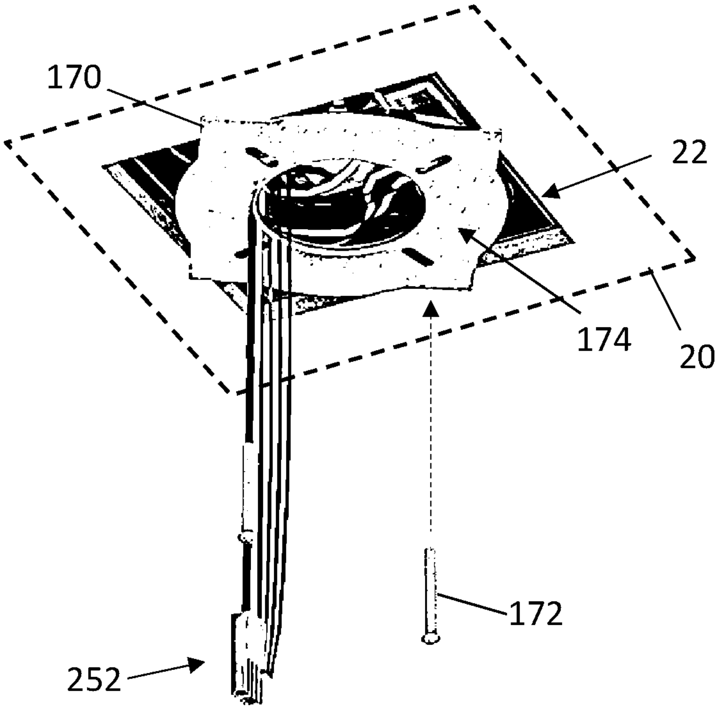
FIG. 10 is a perspective view of continued installation as in FIG. 9, with a mounting surface illustrated as a ceiling portion captured between the occluded mounting assembly and the mounting flange.

A wiring harness extends 160 (FIG. 4) from the mounting side 156 of the lighting unit 152 to be electrically coupled to a corresponding wiring harness 252 (FIG. 10) of the electronics module 250 (FIGS. 1, 7). Paired spring clips 162 (FIGS. 3-4) are attached to the mounting side 156 of the lighting unit 152, and extend therefrom, for mechanically coupling the lighting module 150 to the mounting assembly 200 by way of a mounting flange 170 (FIGS. 8-10). In the illustrated embodiment, the spring clips 162 are diametrically opposed across the geometric center of the circular mounting side 156 of the lighting unit 152, where a proximal end 158 (FIG. 4) of the wiring harness 160 extends from the lighting module 150.

The lighting module 150 includes a ring bezel 164 circumferentially surrounding the lighting unit 152 and open at least in the direction of the an illuminating side 154. The bezel 164 has a downward facing annular ring 166 by which the illuminating side 154 is offset to protect same from incidental contact in handling, packaging, installation, and use. The ring 166 is connected to a frustoconical tapered band 168. The band 168 (FIG. 1) expands slightly diametrically from its lower edge at the annular ring 166 toward its upper edge 169, from which the mounting side 156 (FIG. 4) of the lighting unit 152 is offset inwardly to protect same. The bezel 164 thus defines the lower and upper contact features of the lighting module 150 in a typical installation in a ceiling, and thereby defines the depth D of the installed light system 100, which is the distance from the lower edge of the bezel 164 at the annular ring 166 to its upper edge 169 and represents the dimension by which the lighting system 100 extends into an inhabited or traveled space.

The mounting assembly 200 (FIGS. 6-7) includes a housing 202, shown with a rectangular box form in the illustrated embodiment, with bracket arms 204 for use in attaching the mounting assembly 200 to host structures 10, such as the illustrated beams represented in dashed-line view in FIG. 7. Each bracket arm has a central base 206 and opposing brackets 210 extending in opposite directions from the base 206. The brackets 210 have mounting holes for use in attaching the mounting assembly 200 to a host structures 10, by way of fasteners 216 such as screws and/or nails. Each bracket 210 has a mounting plate 212 (FIG. 6) for attachment to a first side of a host structure such as a four-sided beam or board, and a claw end 214 extending at a right angle from the mounting plate for registration with and/or attachment to a second side of such a host structure or other support. This serves general alignment and secure mounting of the lighting system 100 to the host structure and flexibility in mounting the mounting assembly overall.

An interior space 208 (FIG. 6) of the housing 202 holds and supports the electronics module 250 in the assembled condition of the lighting system 100. In a typical installation, provided as a non-limiting example, the interior space opens downward toward a ceiling portion, with reference to the mounting surface 20 (FIG. 8), which is prepared with a corresponding hole 22 (FIGS. 8 and 10) for access to the interior space through the ceiling portion.

The host structure 10 and the mounting surface 20 proximal the host structure are described herein respectively as a beam and a ceiling portion, with particular reference to FIG. 8, and are shown and described herein as an exemplary non-limiting use and context for the lighting system 100 and components thereof. More generally, the mounting assembly 200 can be attached to other host structures, for flush mounting of the mounting side 156 of the lighting unit 152 with the mounting surface.

The mounting flange 170 is provided with the lighting system 100 to stabilize mounting, with the ceiling portion captured between the mounting assembly 200 and the mounting flange, for example as shown in FIG. 8. The flange 170 is connected to the mounting assembly 200 using fasteners 172, illustrated as bolts in the illustrated embodiment threaded into corresponding threaded holes in the mounting assembly 200 as shown in FIG. 8. The flange 170 has a central opening 174 (FIG. 9) through which the wiring harness 252 extends (FIG. 10) from the electronics module 250 and which also receives the spring clips 162 extending from the mounting side 156 of the lighting unit 152.

Once the wiring harnesses (160, 252) are electrically coupled, they can be manually gathered and placed into the interior space of the housing 202 through the opening 174, which is dimensioned to accommodate their passage into the interior space 208. The lighting module 150 can then be pressed upward to complete installation, with the spring clips 162 elastically deforming to pass through the opening 174, and resiliently rebounding or expanding as they extend therethrough, thereby automatically engaging and capturing the flange. Thus, the flange 170 is supported by the mounting assembly 200, and the lighting module 150 is supported by the mounting assembly via the flange 170.

In the above-referenced embodiment, the mounting assembly 200 (FIGS. 5-7) includes two bracket arms 204 attached to opposing sides of the housing 202. This arrangement provides a stable two-sided symmetric mounting. Each bracket arm is attached at its respective base 206 to the housing by way two parallel linear tracks 220, which are mounted on the respective opposing sides of the housing 202. Each base is mounted at an adjustable position along the respective tracks 220 by fasteners 222 (FIG. 8). Each track 220 has a linear slot 228 by which a respective fastener 222 can be engaged at an adjustable position along the track. The fasteners 222 are screws in at least one embodiment. The fasteners 222 can be loosened to selectively permit movement of the housing 202 relative to the bracket arms. This permits adjustment, represented by the double arrow 224 in FIG. 8, of the housing 202 relative to the mounting surface 20 once the bracket arms are mounted on the host structure 10. This also permits independent adjustment of each bracket arm 204, permitting, for example, the brackets 210 to reach rafters and other architectural components in or above a ceiling to which the lighting system is to affixed. In some examples, each bracket arm can extend twelve to twenty-four inches in length. Other dimensions are within the scope of these drawings.

In an installation of the lighting system along a ceiling, the opposing brackets 210 effectively translate vertically up and/or down as the position of base 206 is adjusted along the tracks 220. In at least one embodiment, the translation range is about one inch. Also a spacer 218 (FIG. 9) can be fit between the housing 202 and the lighting module 150 to raise the housing 202 and provide force support and avoid bowing or skewing of components. These and above-described features allow the lighting module to be installed to various vertical heights to accommodate ceiling tiles of varying thicknesses. Thus, a compact low profile installment is enabled, with the lighting module 150 abutting a mounting surface 20 such as a ceiling portion in close contact and time efficient installations are facilitated.

Figure 5:
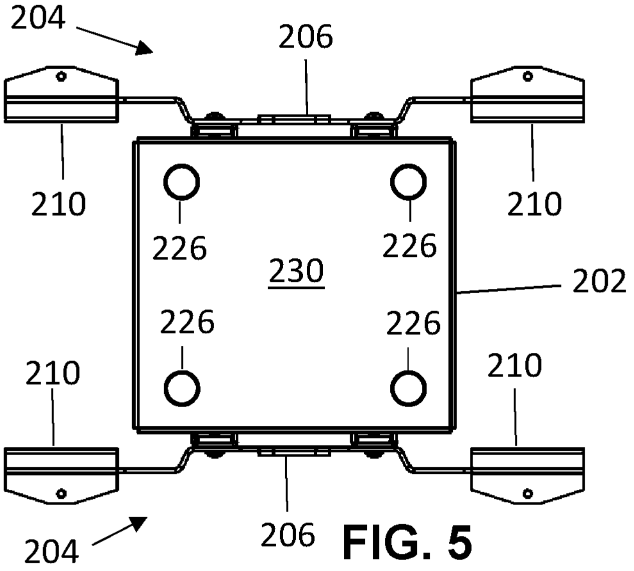
FIG. 5 is top view of a mounting assembly of the system of FIG. 1, taken from directly above with respect to a typical installation orientation.
Figure 6:
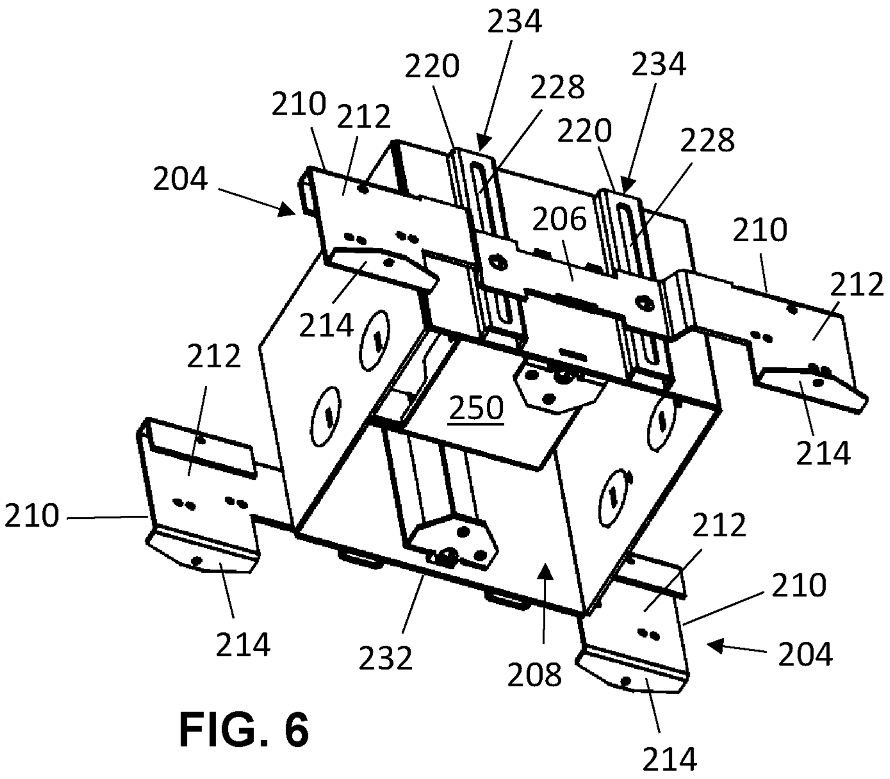
FIG. 6 is a bottom perspective view of the mounting assembly of FIG. 5, taken from indirectly below with respect to a typical installation orientation.

As shown in FIG. 5, mounting holes 226 may be included along the top plate 230 of the housing, opposite the lower open end 232 (FIG. 6), through which the interior space 208 is accessed when needed. The mounting holes 226 enable the housing 202 to be hung or otherwise attached to support structures above a ceiling, such as the interior or a roof, by use of hooks and/or cables and/or other hanging or fixing elements. Elements such as i-hooks can be included and used with the housing, engaging the top plate 230 via the holes for example, and enabling the housing to be suspended from the interior of a roof where there are no available trusses or beams, a configuration sometimes present in commercial building. Additionally and/or alternatively, the slots 228 of the tracks 220, and the openings 234 (FIG. 6)

formed by the ends of the tracks in cooperation with the slots can be used by installers as attachment points using wires, hooks, and other elements as needed or available.

The independent adjustable mounting positions of the bracket arms 204 on the housing 202 along the tracks 220, and the mounting holes 226, thus provide synergetic advantages being features of a mounting assembly 200, as illustrated and described, whether or not the arms 204 and holes 226 are both used in any giving installation scenario. Their cooperative advantage is present at least in the flexibility of use of the mounting assembly, in that such an assembly, once stocked and transported to a facility or installation location, can be widely used in many installment circumstances.

Figure 11:
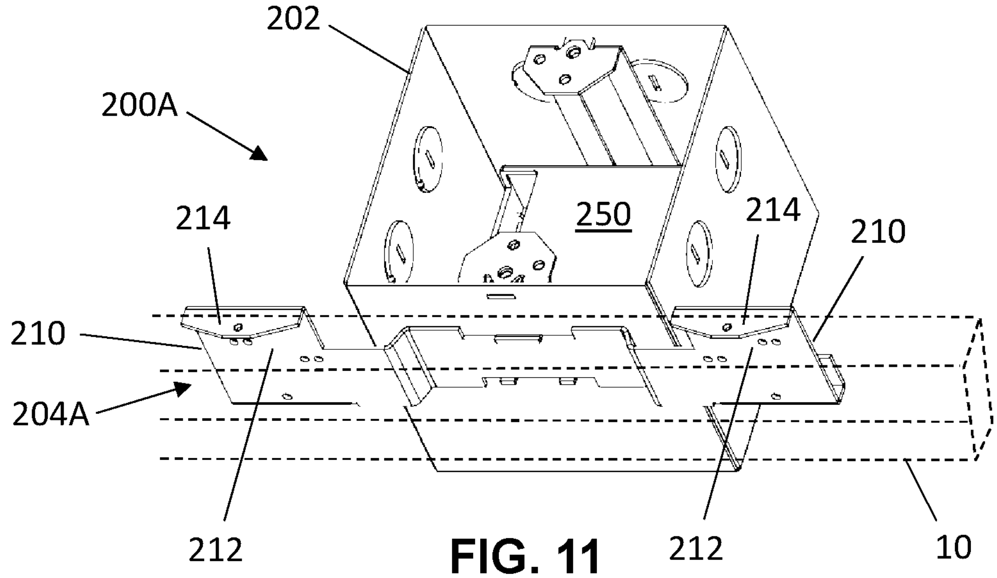
FIG. 11 is a perspective view of an installation of a mounting assembly having a single bracket arm according to at least one embodiment, on host structure illustrated as an architectural beam, with the electronics module housed in the assembly.
Figure 12:
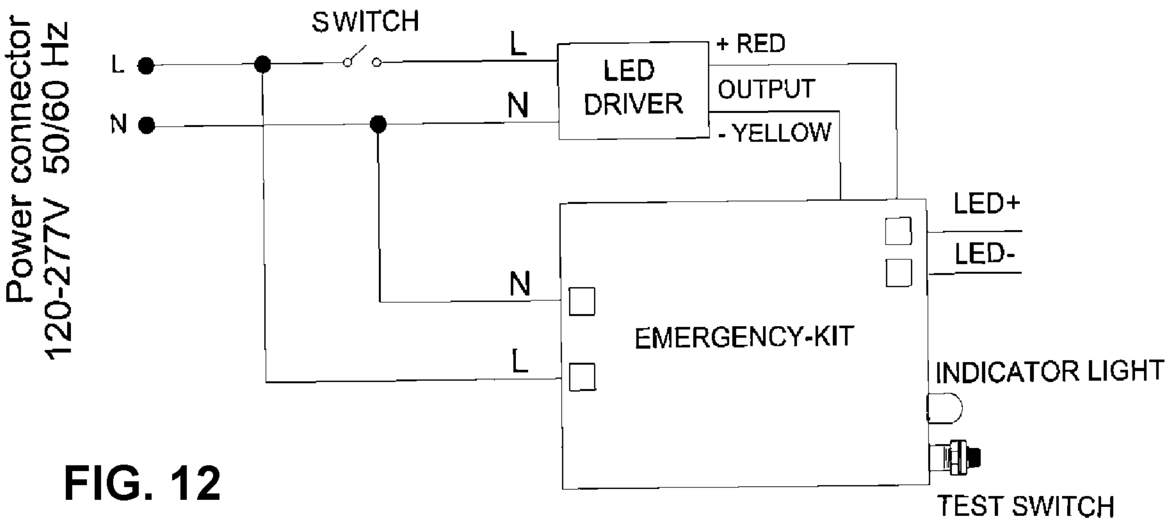
FIG. 12 is a wiring diagram for the electronics module of the system of FIG. 1, according to at least one embodiment.
Figure 13:
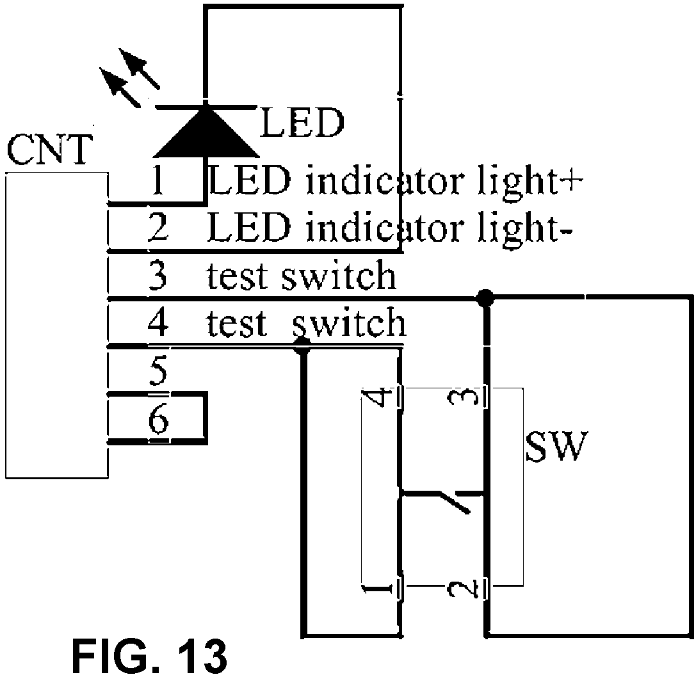
FIG. 13 is a block diagram for a controller for the electronics module, showing test point functions.
Figure 14:
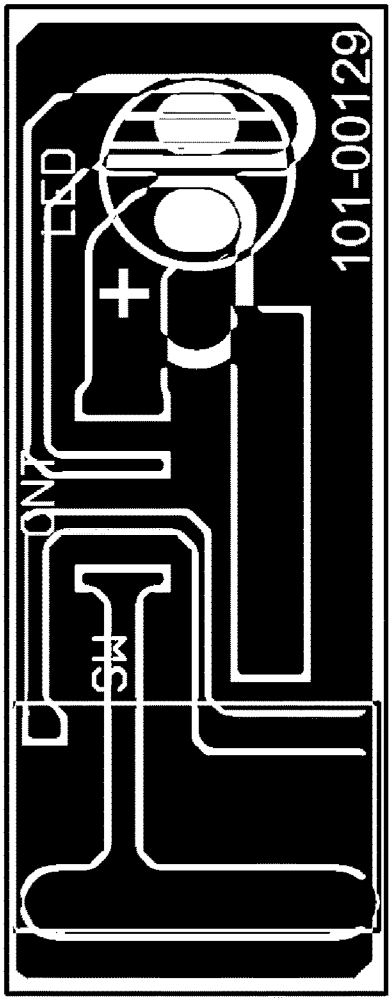
FIG. 14 is an LED layout diagram, according to at least one embodiment, for use as a light cell in an array in the lighting module of FIG. 2.
Figure 15:
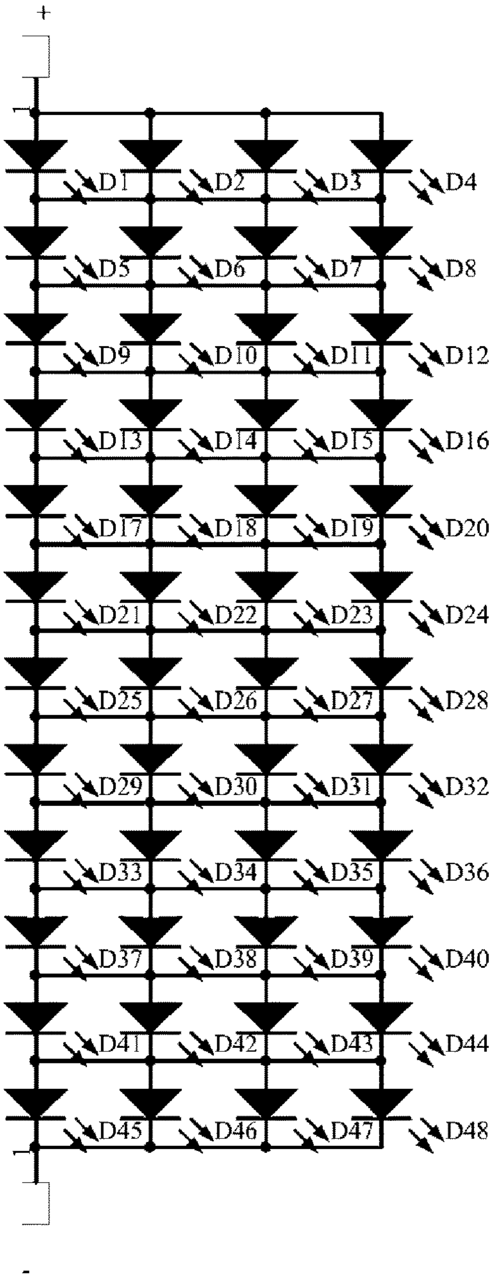
FIG. 15 is a rectangular LED array layout diagram, according to at least one embodiment, for use as an array in the lighting module of FIG. 2.
Figure 16:
FIG. 16 shows a linear arrangement of LED cells, for use as an array in the lighting module of FIG. 2, according to at least one embodiment.
Figure 17A:
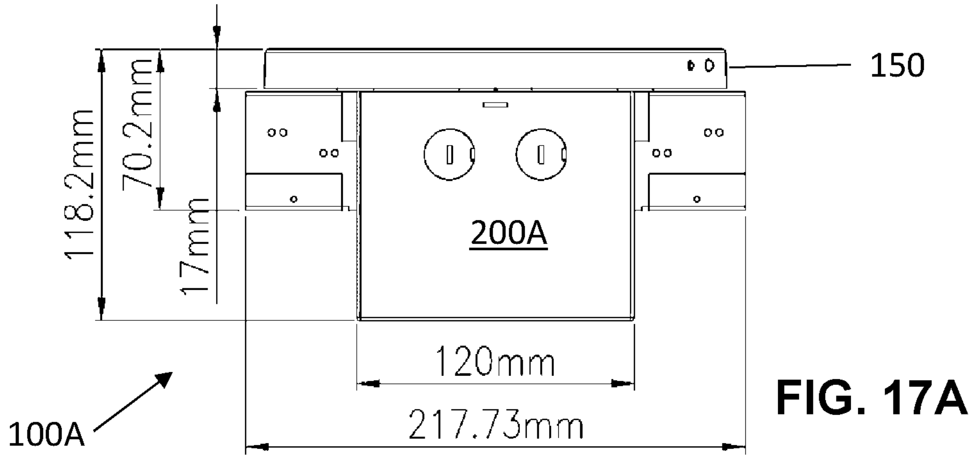
FIG. 17A is an inverted elevation view of a lighting system having the lighting module of FIG. 2 and the single-arm mounting assembly of FIG. 11, with exemplary non-limiting dimensions provided for full disclosure of a particularly advantageous embodiment of a light system.
Figure 17B:
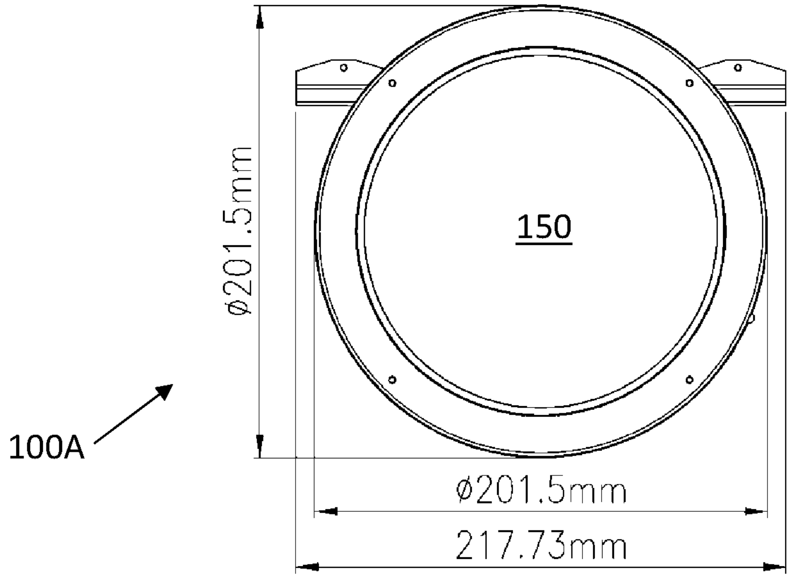
FIG. 17B is a bottom plan view of the lighting system of FIG. 17A, with exemplary non-limiting dimensions provided for full disclosure of a particularly advantageous embodiment.
Figure 17C:
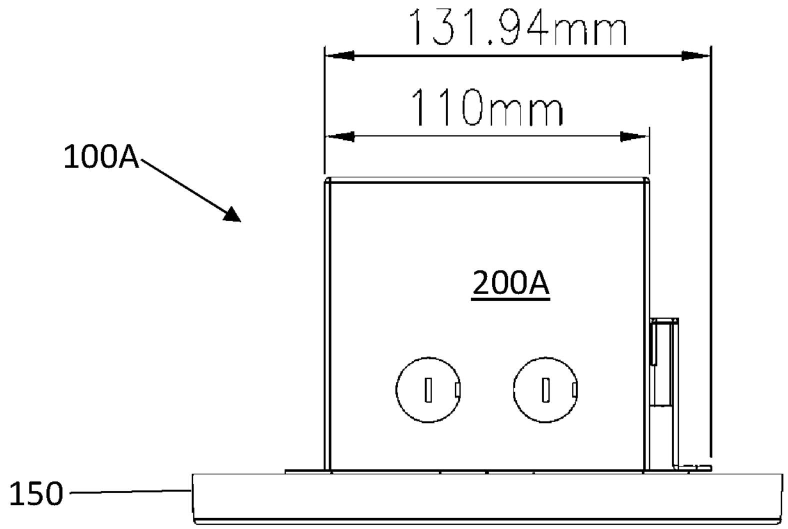
FIG. 17C is a side elevation view of the lighting system of FIGS. 17A-17C, with exemplary non-limiting dimensions provided for full disclosure of a particularly advantageous embodiment.
Figure 17D:
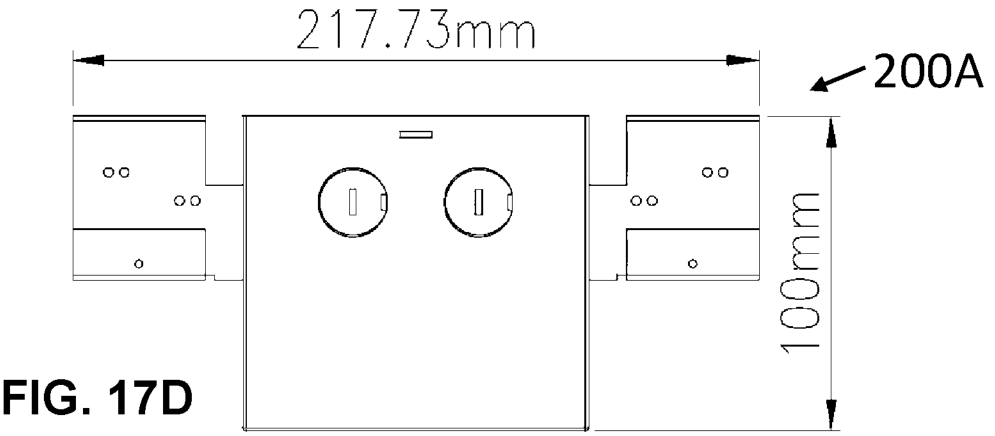
FIG. 17D is an inverted elevation view of the single-arm mounting assembly of FIG. 11, with exemplary non-limiting dimensions provided for full disclosure of a particularly advantageous embodiment of a light system.
Figure 17E:
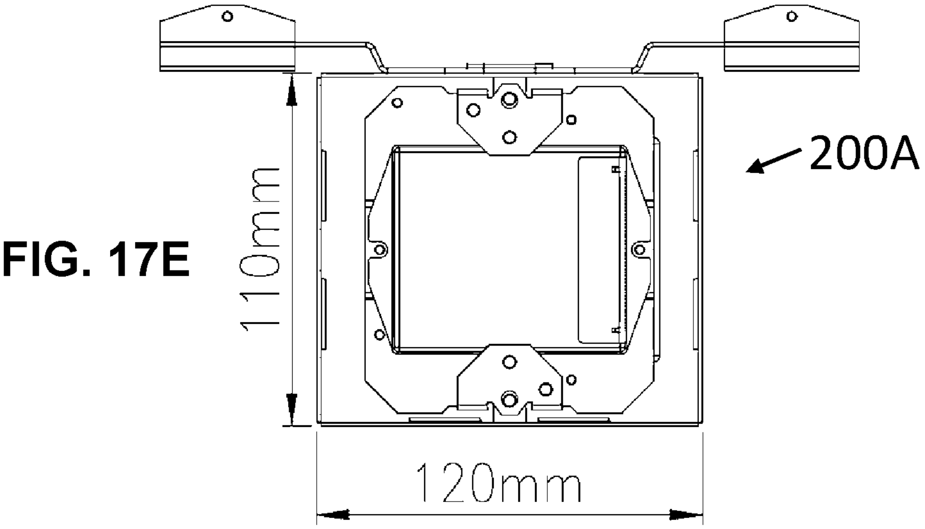
FIG. 17E is a bottom plan view of the single-arm mounting assembly of FIG. 11, with exemplary non-limiting dimensions provided for full disclosure of a particularly advantageous embodiment.
Figure 17F:
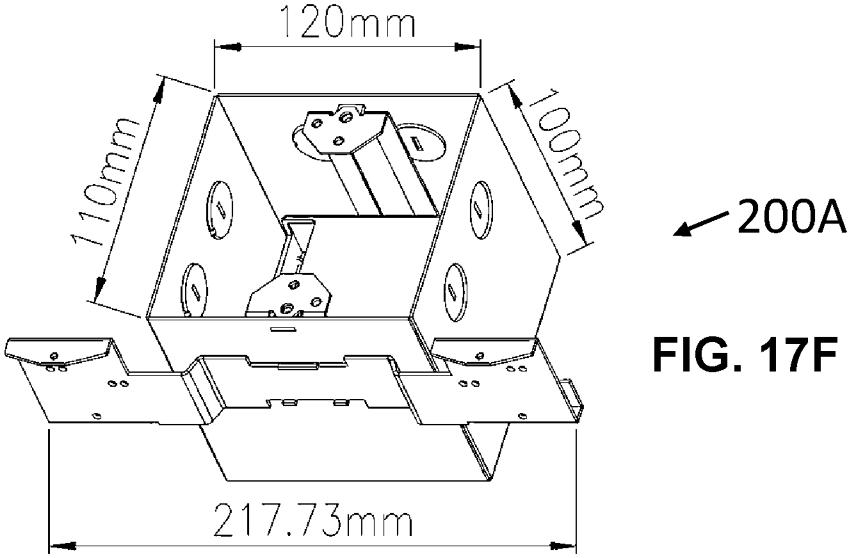
FIG. 17F is a bottom perspective view of the single-arm mounting assembly of FIG. 11, with exemplary non-limiting dimensions provided for full disclosure of a particularly advantageous embodiment.

In a second embodiment of the mounting assembly 200A (FIG. 11), a single bracket arm 204A is attached to a side of the housing 202, for which the above descriptions otherwise apply as suggested by use of same reference numbers.

In a non-limiting example, as illustrated in FIG. 8, the lighting system 100 is generally electrically powered by a cable 260 (FIG. 8) coupled to the electronics module 250 and extending from the housing to a host facility power supply such as a breaker box or other facility wiring arrangement. The electronics module 250 in the illustrated embodiment includes an onboard battery 254 (FIG. 1) and circuitry that detects a power failure in the cable 260, at which incident the electronics module 250 powers the lighting module 150 by use of the battery 254, thereby providing EM lighting. Various embodiment of the lighting system 100 are within the scope of these descriptions and drawings. Various required lighting durations during battery powered lighting periods can be established by various embodiments and/or various settings of the electronics module 250.

Figure 18A:
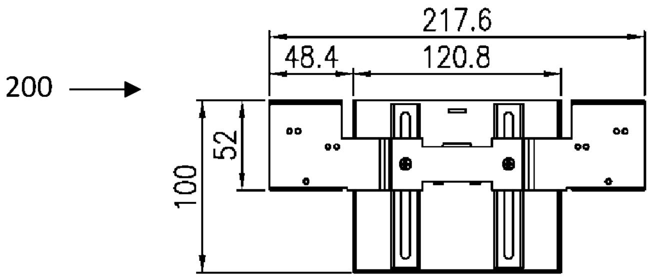
FIG. 18A is an inverted elevation view of the mounting assembly of FIG. 8, with exemplary non-limiting dimensions provided for full disclosure of a particularly advantageous embodiment of a light system.
Figure 18B:
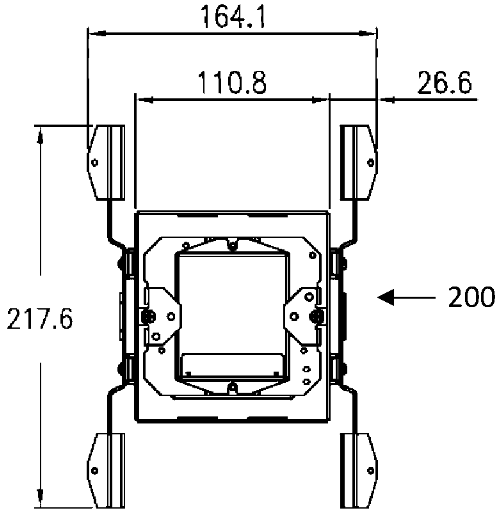
FIG. 18B is a bottom plan view of the mounting assembly of FIG. 18A, with exemplary non-limiting dimensions provided for full disclosure of a particularly advantageous embodiment.
Figure 18C:
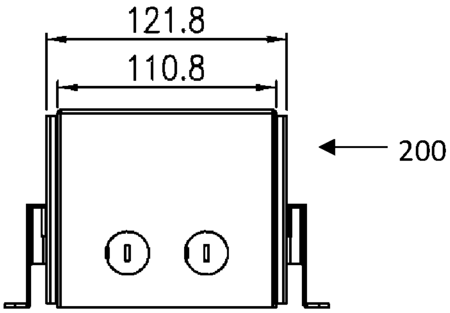
FIG. 18C is a side elevation view of the mounting assembly of FIGS. 18B-18C, with exemplary non-limiting dimensions provided for full disclosure of a particularly advantageous embodiment.

These descriptions relate to many embodiments having many relative and absolute dimensions. FIGS. 17A-17F provide dimensions in millimeters for full disclosure of at least one particular embodiment with respect at least to a lighting system 100A, having the mounting assembly 200A as in FIG. 11, and for which the above descriptions otherwise apply. Similarly, FIGS. 18A-18C provide dimensions in millimeters for full disclosure of at least one particular embodiment with respect at least to the mounting assembly 200.

Figure 19A:
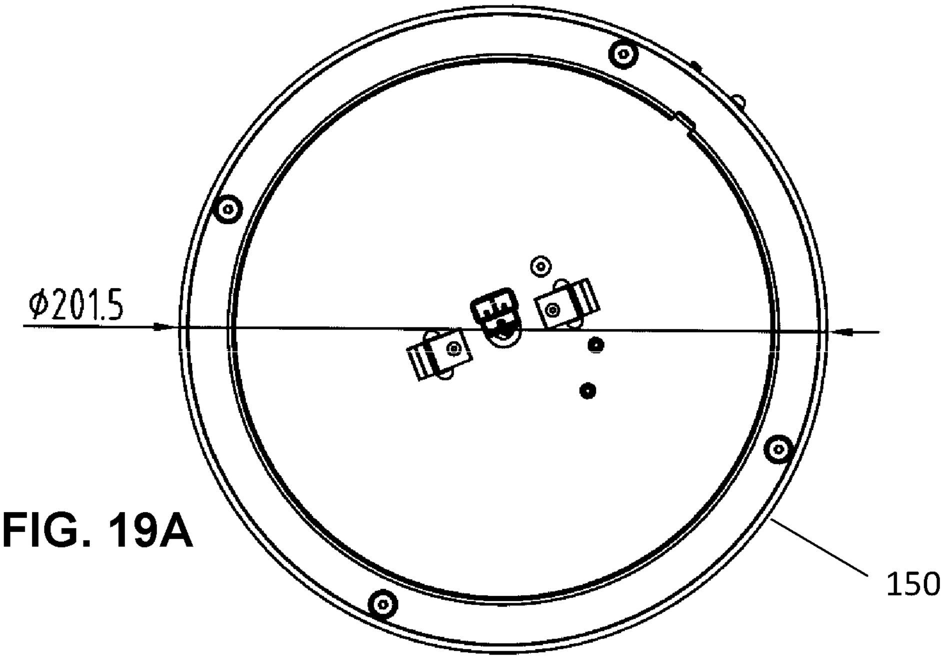
FIG. 19A is a top plan view of the lighting module of FIGS. 2-4, with exemplary non-limiting dimensions advantageously adapted for use in the lighting system embodiment of FIGS. 17A-17C.
Figure 19B:
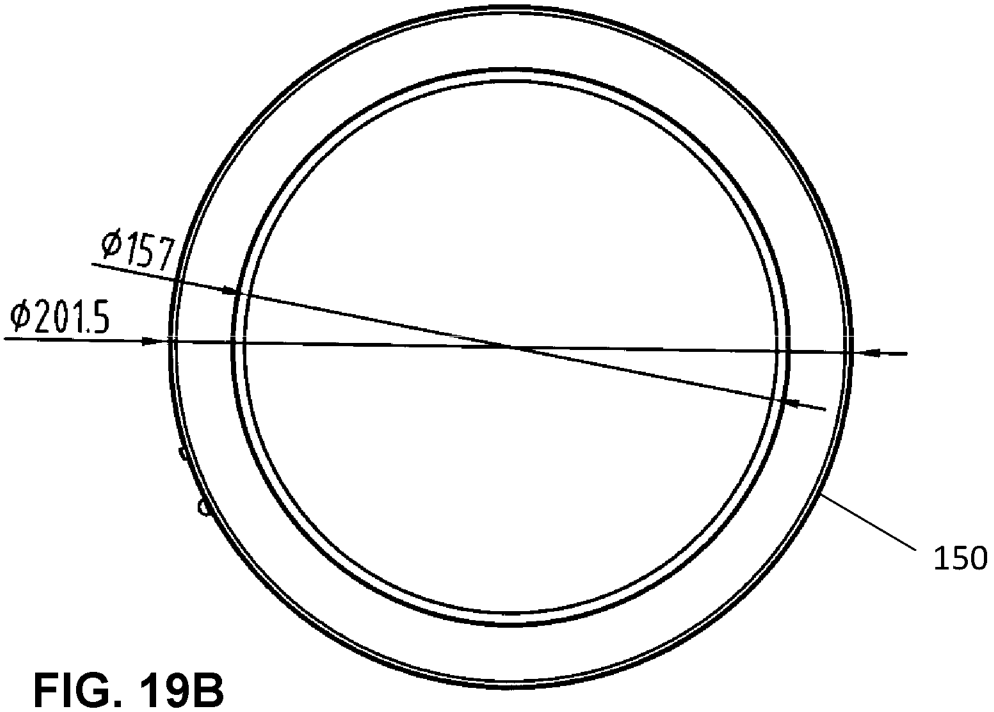
FIG. 19B is a bottom plan view of the lighting module of FIG. 19A, with exemplary non-limiting dimensions.
Figure 19C:
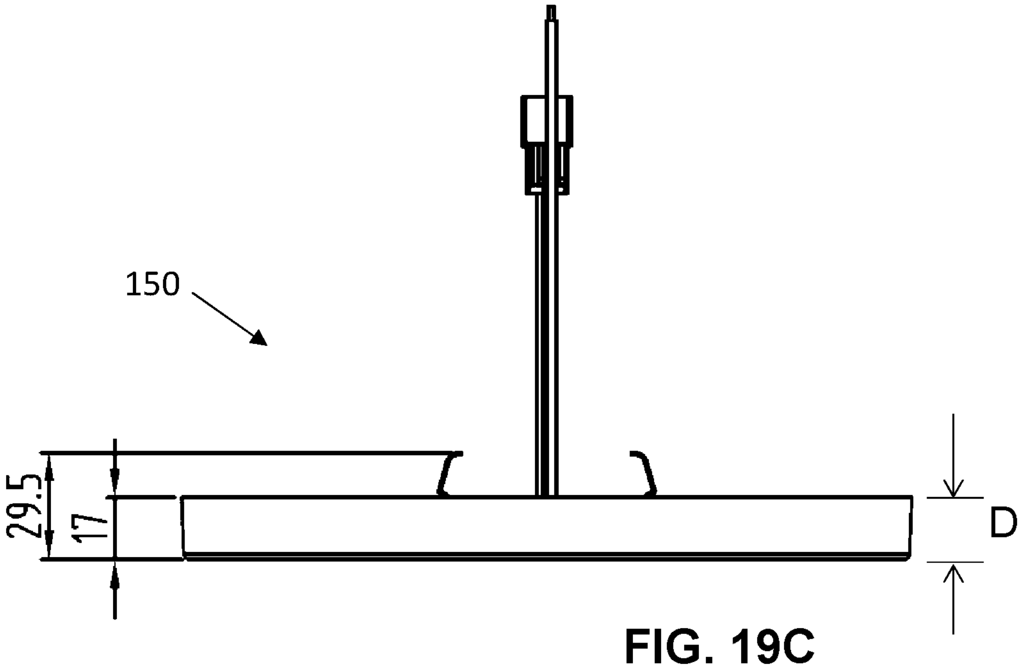
FIG. 19C is a side elevation view of the lighting module of FIGS. 2-4, with exemplary non-limiting dimensions for a compact low profile depth.

FIGS. 19A-19C provide dimensions in millimeters for full disclosure of at least one particular embodiment with respect at least to the lighting module 150. The particular example provided in FIG. 19C for the depth D of the lighting unit as seventeen millimeters (approximately five-eighths of an inch) is advantageous at least in providing a limited or diminished depth D in extending from a ceiling or other mounting surface, providing a low profile system with respect to the interior of a corridor or the like, for example with the mounting assembly 200 or 200A generally out of sight in a plenum above a ceiling portion as suggested in FIG. 10, occluded by the ceiling portion and lighting unit.

When installed as shown in the drawings, with reference to embodiments according to FIGS. 17A-19C and other embodiments having other dimensions, the mounting side of the lighting unit 150 is generally flush with a surface such as the interior side of a ceiling. Thus, the depth D represents the predefined small dimension by which the lighting system 100 extends into an inhabited or traveled space such as a corridor. By placement of the electronics module and battery thereof within the mounting assembly and thus beyond a mounting surface and generally out of sight, the appearance of the lighting system 100 or 100A can advantageously match regular lighting units have appearance same or similar light units as the lighting unit.

Although the foregoing description provides embodiments of the invention by way of example, it is envisioned that other embodiments may perform similar functions and/or achieve similar results. Any and all such equivalent embodiments and examples are within the scope of the present invention.

What is claimed is:

1. A lighting system comprising:

(a) a mounting assembly configured for mounting on a host structure proximal to a mounting surface, wherein the mounting assembly comprises a housing and two bracket arms coupled to opposing sides of the housing, wherein (i) each of the two bracket arms is attached by the respective base thereof to the side of the housing by way of two parallel linear tracks mounted on the respective side of the housing, wherein each side of the housing forms a sidewall plane, (ii) each of the two bracket arms comprises a base and two opposing brackets extending in opposite directions outward from the base, wherein (A) the opposing brackets have a first end proximate to the base and a second end opposite the base and extend in an approximately linear direction from the first end to the second end, and (B) the opposite directions each extend approximately parallel to the sidewall plane and away from the side of the housing on which the linear tracks are mounted, (iii) each of the two opposing brackets comprises a mounting plate at the second end that frictionally engages a first surface of the host structure, and (iv) each of the two opposing brackets comprises a claw extending at a right angle from the mounting plate, wherein the claw frictionally engages a second surface of the host structure;

(b) a lighting module including a lighting unit having a mounting side configured for attachment to the mounting assembly approximately flush with the mounting surface; and (c) an electronics module supported by the mounting assembly, the electronics module including an onboard battery that powers the lighting module upon the electronics module detecting a power failure.

2. The lighting system of claim 1, wherein the lighting unit has a depth of at most 17 millimeters extending from the mounting surface, defining a low profile lighting system, with the mounting assembly generally out of sight above the mounting surface.

3. The lighting system of claim 1, further comprising a mounting flange, wherein the lighting module comprises spring clips attached to the mounting side of the lighting unit for mechanically coupling the lighting module to the mounting assembly by engaging the mounting flange.

4. The lighting system of claim 3, wherein the lighting module comprises a wiring harness extending from the mounting side of the lighting unit for electrically coupling the lighting unit to a corresponding wiring harness of the electronics module.

5. The lighting system of claim 4, wherein the spring clips comprise two spring clips diametrically opposed with respect to a proximal end of the wiring harness of the lighting module.

6. The lighting system of claim 5, wherein the lighting unit is circular, and wherein the two spring clips are diametrically opposed across a geometric center of the mounting side of the lighting unit, where the proximal end of the wiring harness of the lighting module extends from the lighting unit.

7. The lighting system of claim 6, wherein, the mounting flange defines an opening through which the wiring harness of the electronics module extends for electrically coupling to the wiring harness of the lighting module during installation.

8. The lighting system of claim 7, wherein when the lighting module is pressed toward the mounting assembly, the spring clips elastically deform to pass through the opening, and resiliently expand as they extend therethrough, thereby automatically capturing the mounting flange.

9. The lighting system of claim 1, wherein the host structure is a component of a structure configured to accommodate human inhabitants.

10. The lighting system of claim 1, wherein the base of each bracket arm is mounted at an independently adjustable position along the two parallel linear tracks mounted on the respective side of the housing.

11. The lighting system of claim 10, wherein the base of each bracket arm is mounted at the independently adjustable position along the two parallel linear tracks by fasteners engaged with the tracks, wherein the fasteners selectively permit movement of the housing relative to the bracket arms.

12. The lighting system of claim 11, wherein the movement of the housing relative to the bracket arms permits adjustment of the housing relative to the mounting surface in use.

13. A lighting system comprising:

(a) a mounting assembly comprising
  (i) a housing,
  (ii) a first track mounted on the housing, and a first bracket arm for attaching the housing to a host structure, wherein the first bracket arm comprises
    (A) a base, and
    (B) opposing brackets extending in opposite directions from the base comprising a first end proximate to the base and a second end opposite the base and extend in an approximately linear direction from the first end to the second end, wherein the opposite directions are transverse to first track, and the base is mounted at an adjustable position on the first track; and (b) a lighting unit having a mounting side configured for attachment to the mounting assembly.

14. The lighting system of claim 13, wherein at least one bracket of said opposing brackets comprises a mounting plate for attachment to the host structure, and a claw end extending from the mounting plate.

15. The lighting system of claim 13, wherein the mounting assembly further comprises: a second track mounted on the housing, the first track and second track mounted on opposing sides of the housing; and a second bracket arm comprising a base and opposing brackets extending in opposite directions from the base, wherein the opposite directions are transverse to second track, and the base is mounted at an adjustable position on the second track.

16. The lighting system of claim 15, wherein the mounting assembly further comprises: a third track mounted on the housing on a same side thereof as the first track, the first track and third track being each linear and parallel to each other, the base of the first bracket arm being mounted at an adjustable position on the third track; and a fourth track mounted on the housing on a same side thereof as the second track, the second track and fourth track being each linear and parallel to each other, the base of the second bracket arm being mounted at an adjustable position on the fourth track.

17. The lighting system of claim 16, wherein:

the base of the first bracket arm is mounted at a first adjustable position along the first and third track;

the base of the second bracket arm is mounted at a second adjustable position along the second and fourth track; and the first adjustable position and second adjustable position are independently adjustable.

18. The lighting system of claim 17, wherein the first adjustable position and second adjustable position are independently adjustable to selectively permit movement of the housing relative to the bracket arms.

19. The lighting system of claim 14, wherein at least one bracket of said opposing brackets comprises mounting holes for use in attaching the mounting assembly to the host structure.

20. The lighting system of claim 13, further comprising a mounting flange, wherein (i) the lighting unit is coupled to the mounting assembly, (ii) the mounting flange is coupled to the mounting assembly proximal to the mounting side of the lighting unit, and (iii) a ceiling portion is captured between the mounting assembly and the mounting flange.

21. The lighting system of claim 13, further comprising an electronics module secured within the housing, wherein the electronics module comprises an onboard battery that powers the lighting module upon the electronics module detecting a power failure.

* * * * *